UNITED STATES PATENT OFFICE 2,658,922

PROCESS FOR PREPARING DIMETHOXY-DECADIENES

Richard S. Urban, Philadelphia, Pa., assignor to Rohm & Haas Company, Philadelphia, Pa., a corporation of Delaware No Drawing. Application October 10, 1951,
Serial No. 250,815

5 Claims. (Cl. 260—615)

This invention relates to an improved process for the preparation of a mixture of isomeric dimethoxydecadienes, all of which isomers have the formula $CH_3O-C_{10}H_{16}-OCH_3$. More particularly it relates to the use of particular catalytic agents or activators which not only accelerate the rate of the chemical reaction by which the isomeric dimethoxydecadienes are prepared but, of greater importance, also regulate the course of the reaction so that one particular isomer, namely 1,10-dimethoxydecadiene-3,7, is produced in preponderant amount. This is especially desirable because this isomer can be readily converted to sebacic acid for which the current demand is enormous.

It has been shown, for example in U. S. Patent No. 2,075,312 of March 30, 1937, that butadiene and chloromethyl methyl ether react to form 1-methoxy-5-chloropentene-3 together with the position isomers and geometric isomers of this product, all of which compounds have the formula $CH_3O-C_5H_8-Cl$. It is also known that these isomeric methoxychloropentenes, $$CH_3O-C_5H_8-Cl$$

can be coupled to form a mixture of dimethoxydecadienes, all having the formula $$CH_3O-C_{10}H_{16}-OCH_3$$

That is, two molecules of the methoxychloropentenes react so as to split off chlorine atoms and react to form one molecule of 1,10-dimethoxydecadiene-3,7 together with the position isomers and geometric isomers of this compound. The position isomers have the following formulas but it is to be noted that the cis- and trans-forms of the compounds I and III also exist in the mixture:

(I) $CH_3O-CH_2CH_2CH=CHCH_2CH_2CH=CHCH_2CH_2-OCH_3$ (II) $CH_3O-CH_2CH_2CH=CHCH_2CHCH_2CH_2-OCH_3$
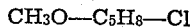
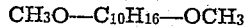

(III) $CH_3O-CH_2CH_2CH-CH-CH_2CH_2-OCH_3$
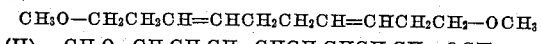
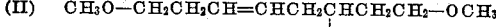
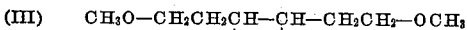

The relative amounts of the isomer I in a mixture of isomers can be determined by first hydrogenating the dimethoxydecadienes to dimethoxydecanes and treating the mixture of dimethoxydecanes with a solution of urea in methanol. Only the straight-chained dimethoxydecane from isomer I reacts to form a complex with the urea and this complex can then be separated from the other isomeric dimethoxydecanes derived from isomers II and III.

Nickel carbonyl has been proposed as a coupling agent. Also in another of my applications, Serial No. 230,685, filed June 8, 1951, I have shown the advantage of employing finely divided metallic iron or nickel for this purpose.

The instant invention resides in the discovery that the rate of reaction can be increased and the course of the coupling reaction can be directed to the production of larger amounts of the particular isomer, 1,10-dimethoxydecadiene-3,7, when a finely divided metal or a salt of a metal which is below iron in the electromotive series is employed. For the sake of convenience and in view of the influence which these materials exert in conjunction with the iron coupling agent they are termed activators.

The metals which are employed as such or in the form of salts together with the iron and which are below iron in the electromotive series are cadmium, cobalt, nickel, tin, lead, palladium, copper, mercury, silver, gold and platinum. While all of these serve as activators in the instant invention in conjunction with iron, it is preferred for reasons of economy and efficiency to employ metallic copper, nickel, cobalt and mercury and the salts of these elements. All of the salts of all of the metals listed above are operable—that is, the water-soluble or water-insoluble salts of organic and inorganic acids. Actually the salts of the strong inorganic acids, typified by chlorides, sulfates, nitrates and phosphates are preferred but others such as acetates, formates, oxalates, benzoates and phthalates can be used.

The iron should be in finely divided form. While coarse metal filing can be used, the yield of dimethoxydecadienes is unnecessarily low. Therefore, the iron should be so finely divided as to pass through a No. 140 U. S. Standard sieve. Since the oxide of iron inhibits the reaction it is most desirable that the metal be pure. This is also true of the activators when they are used in the metallic form. At least one-half mol of iron is employed per mol of methoxychloropentene inasmuch as the iron combines with the chlorine atoms which are split from the methoxychloropentenes in the coupling reaction. In fact an excess of the order of 10–50% is recommended. The maximum amount of iron which can be used is limited only by considerations of economy and mechanics.

The amount of activator should be within the range of 1 to 15%—or preferably from 2 to 8%— calculated as metal and based on the weight of the iron. Thus if a salt is employed, that amount of the salt is taken which provides 1–15% of the metal in the salt, based on the iron.

The reaction of methoxychloropentenes with finely divided iron and the activators is carried out at a temperature from about 10° C.—or preferably about 20° C.—to the refluxing temperature of the reaction mixture.

The use of a solvent is strongly recommended in order to facilitate the reaction. Alcohols in general are good solvents and of these ethanol is the best. Many other alcohols have been studied and it has been found that those containing one to seven carbon atoms, such as butyl, hexyl and benzyl alcohols have an advantage over the higher alcohols in that they can be more readily and clearly separated from the reaction mixture by distillation. Other preferred solvents include acetonitrile, dimethylformamide, propionitrile, butyronitrile and dioxane.

The reaction is carried out under normal, super- or sub-atmospheric pressure. For reasons of efficiency it is preferred to employ normal- or super-atmospheric pressures.

The following examples in which all parts are by weight serve to illustrate the process of this invention.

*Example 1*

One-half mol (67.5%) of a mixture of isomeric methoxychloropentenes, $CH_3O-C_5H_8-Cl$, was dissolved in ethanol. (This mixture had been prepared by passing butadiene, at the rate of 216 parts (4 mols) per hour, into a mixture of 498 parts of methylchloromethyl ether and 25 parts of zinc chloride at 12–20° C. over a period of three hours, after which the reaction product was washed and fractionally distilled to provide a yield of 70% of a material identical with that made by the process of Example 2 of U. S. Patent 2,075,312.) The solution was stirred and blanketed with carbon dioxide while to it was added 16.8 parts (0.3 mol) of hydrogen-reduced iron of such a particle size as to pass through a No. 140 U. S. Standard sieve. The mixture was stirred vigorously and was heated to the refluxing temperature at which point it was held for 22 hours. It was then cooled and shaken with 150 parts of water and 105 parts of diethyl ether. The ether layer was separated, was washed with water and then was dried over a desiccant. The ether was removed by distillation and the crude product was fractionally distilled. A 64% yield of isomeric dimethoxydecadienes was obtained. It was determined that 1,10-dimethoxydecadiene-3,7 made up 50% of this mixture.

The above procedure was followed in testing the effectiveness of the so-called activators in directing the course of the reaction. The only change was the addition of a sulfate salt of copper or cobalt or nickel or mercuric chloride in an amount to provide 2% of the respective metal based on the weight of iron. The reaction proceeded as above described and the yields of total isomers were essentially the same; but in every case the amount of 1,10-dimethoxydecadiene which was obtained was at least 30% higher than when iron alone was employed. In the cases where copper or nickel sulfates were used the increases in the yield of 1,10-dimethoxydecadiene were 50% and 52%, respectively.

*Example 2*

By a procedure similar to that described in Example 1 above, 0.5 mol of a mixture of isomeric methoxychloropentenes was reacted, while dissolved in 80 parts of acetonitrile, with 0.3 mol of commercially available, powdered, hydrogen-reduced iron. The mixture was stirred, blanketed with carbon dioxide and was heated at refluxing temperature for four hours. The product was worked up in the manner described in Example 1 above and a 72% yield of the isomeric dimethoxydecadienes was obtained. Analysis showed that 52% of this mixture was 1,10-dimethoxydecadiene-3,7.

The same procedure was followed in several instances except that nickel sulfate, nickel chloride or Raney nickel was used in conjunction with the iron. Following is a tabulation of the results.

| Activator | Percent of Ni Based on Fe | Percent Total DMDD [1] | Percent Isomer I in Mixture |
|---|---|---|---|
| None | 0 | 72 | 52 |
| $NiSO_4 \cdot 6H_2O$ | 2.6 | 75 | 72 |
| $NiSO_4 \cdot 6H_2O$ | 6.5 | 80 | 80 |
| $NiSO_4 \cdot 6H_2O$ | 13.0 | 75 | 75 |
| $NiCl_2 \cdot 6H_2O$ | 6.5 | 77 | 75 |
| Raney Nickel | 6.5 | 82 | 72 |

[1] DMDD represents the mixture of isomeric dimethoxydecadienes.

In the absence of an activator but in the presence of iron the coupling reaction in acetonitrile requires from two to three hours (as measured by titration of the chloride ion). When an activator such as is described above is used in conjunction with the iron, a vigorous, exothermic reaction occurs in about one hour and the reaction is complete in about one-half hour more. If, alternatively, the iron, activator and acetonitrile are heated together for one-half hour and the mixture of methoxychloropentenes is then added, the exothermic reaction begins in about 15 minutes and the reaction is substantially complete in about one-half hour more. The other advantage, as always, is that the product contains an unusually high ratio of the 1,10-dimethoxydecadiene-3,7.

I claim:

1. In the process for preparing a mixture of isomeric dimethoxydecadienes, all of which have the formula $CH_3O-C_{10}H_{16}-OCH_3$, wherein a mixture of isomeric methoxychloropentenes, all of which have the formula $CH_3O-C_5H_8-Cl$, is dissolved in a solvent and reacted with finely divided iron at a temperature from 10° C. to the refluxing temperature of the reaction mixture, said iron being in such a finely divided form as to pass through a No. 140 U. S. Standard sieve and being present in an amount equal to at least one-half mol per mol of said methoxychloropentenes, the improvement which consists of adding to the reaction mixture an activator from the class consisting of the metals below iron in the electromotive series and salts of said metals, said activator being added in such an amount as to provide 1–15%, based on the weight of said iron, of the metal in said activator.

2. In the process for preparing a mixture of isomeric dimethoxydecadienes, all of which have the formula $CH_3O-C_{10}H_{16}-OCH_3$, wherein a mixture of isomeric methoxychloropentenes, all of which have the formula $CH_3O-C_5H_8-Cl$, is dissolved in a solvent and reacted with finely divided iron at a temperature from 10° C. to the refluxing temperature of the reaction mixture, said iron being in such a finely divided form as to pass through a No. 140 U. S. Standard sieve and being present in an amount equal to at least one-half mol per mol of said methoxychloropentenes, the improvement which consists of adding to the reaction mixture as an activator a nickel salt of a strong inorganic acid in such an amount as to provide 1–15% nickel based on the weight of said iron.

3. In the process for preparing a mixture of isomeric dimethoxydecadienes, all of which have the formula $CH_3O—C_{10}H_{16}—OCH_3$, wherein a mixture of isomeric methoxychloropentenes, all of which have the formula $CH_3O—C_5H_8—Cl$, is dissolved in a solvent and reacted with finely divided iron at a temperature from 10° C. to the refluxing temperature of the reaction mixture, said iron being in such a finely divided form as to pass through a No. 140 U. S. Standard sieve and being present in an amount equal to at least one-half mol per mol of said methoxychloropentenes, the improvement which consists of adding to the reaction mixture as an activator a copper salt of a strong inorganic acid in such an amount as to provide 1–15% copper based on the weight of said iron.

4. In the process for preparing a mixture of isomeric dimethoxydecadienes, all of which have the formula $CH_3O—C_{10}H_{16}—OCH_3$, wherein a mixture of isomeric methoxychloropentenes, all of which have the formula $CH_3O—C_5H_8—Cl$, is dissolved in a solvent and reacted with finely divided iron at a temperature from 10° C. to the refluxing temperature of the reaction mixture, said iron being in such a finely divided form as to pass through a No. 140 U. S. Standard sieve and being present in an amount equal to at least one-half mol per mol of said methoxychloropentenes, the improvement which consists of adding to the reaction mixture as an activator a cobalt salt of a strong inorganic acid in such an amount as to provide 1–15% cobalt based on the weight of said iron.

5. In the process for preparing a mixture of isomeric dimethoxydecadienes, all of which have the formula $CH_3O—C_{10}H_{16}—OCH_3$, wherein a mixture of isomeric methoxychloropentenes, all of which have the formula $CH_3O—C_5H_8—Cl$, is dissolved in a solvent and reacted with finely divided iron at a temperature from 10° C. to the refluxing temperature of the reaction mixture, said iron being in such a finely divided form as to pass through a No. 140 U. S. Standard sieve and being present in an amount equal to at least one-half mol per mol of said methoxychloropentenes, the improvement which consists of adding to the reaction mixture as an activator a mercury salt of a strong inorganic acid in such an amount as to provide 1–15% mercury based on the weight of said iron.

RICHARD S. URBAN.

References Cited in the file of this patent

UNITED STATES PATENTS

| Number | Name | Date |
| --- | --- | --- |
| 2,570,887 | Tabet | Oct. 9, 1951 |